United States Patent [19]
Williams

[11] Patent Number: 5,377,346
[45] Date of Patent: Dec. 27, 1994

[54] METHODS AND APPARATUS FOR PULSE-WIDTH MODULATION THAT USE A COUNTER AND A MODULUS DEVICE

[75] Inventor: Stephen R. Williams, Los Gatos, Calif.

[73] Assignee: NEC Electronics Inc., Mountain View, Calif.

[21] Appl. No.: 534,382

[22] Filed: Jun. 6, 1990

[51] Int. Cl.$^5$ .............................................. G06F 9/00
[52] U.S. Cl. ..................................... 395/550; 395/800; 364/DIG. 2; 364/950; 364/934; 364/933
[58] Field of Search ....................... 395/500, 550, 800; 331/172; 368/202

[56] References Cited
U.S. PATENT DOCUMENTS

| | | | |
|---|---|---|---|
| 3,701,937 | 10/1972 | Combs | 321/2 |
| 4,236,213 | 11/1980 | Richardson | 364/900 |
| 4,279,015 | 7/1981 | Edelman et al. | 395/550 |
| 4,636,711 | 1/1987 | Freymuth | 323/282 |
| 4,683,411 | 7/1987 | Hamilton, Jr. et al. | 318/706 |
| 4,740,915 | 4/1988 | Bonitz et al. | 364/900 |
| 4,935,925 | 6/1990 | Williams et al. | 370/83 |
| 5,138,707 | 8/1992 | Haller et al. | 395/550 |
| 5,168,208 | 12/1992 | Schultz et al. | 322/25 |

OTHER PUBLICATIONS

NEC Electronics Inc., "µPD70320/322 (V25 ™) 16-Bit, Single-Chip CMOS Microcomputers", Aug. 1988, pp. 1–76.

NEC Electronics Inc., "µPD70330/332 (V35 ™) Advanced 16-Bit, Single-Chip CMOS Microcomputers", Oct. 1988, pp. 1–82.

Primary Examiner—Alyssa H. Bowler
Assistant Examiner—Mehmet Geckil
Attorney, Agent, or Firm—Skjerven, Morrill, MacPherson, Franklin & Friel

[57] ABSTRACT

Methods are provided for generating a square wave of variable duty cycle using a microprocessor and an interval timer. The duty cycle can be changed without changing the period. The duty cycle is changed on a rising or a falling edge of the signal as desired.

4 Claims, 8 Drawing Sheets

510. a. Program microprocessor 1 to execute step 610 as the timer 68 ISR.
b. Select desired clock as the input clock.
c. Program timer 68 as an interval timer.
d. Set the initial value of TOUT.
e. Initialize TM0 and MD0.
f. Set up microprocessor 1 to output a square wave on TOUT and to generate timer 68 interrupts.
g. Determine numbers X-1 and Y-1. Store X-1 in memory location LH. Store Y-1 in memory location LL.
h. Enable interrupts and start timer 68

610. ISR
   If TOUT signal high, then
       MD0 ← LL
   Otherwise
       MD0 ← LH

FIG. 7

520. a. Program microprocessor 1 to execute step 620 as the timer 68 ISR.
   b. Select desired clock as the input clock.
   c. Program timer 68 as an interval timer.
   d. Set the initial value of TOUT.
   e. Initialize TM0 and MD0.
   f. Set up microprocessor 1 to output a square wave on TOUT and to generate timer 68 interrupts.
   g. Determine numbers X-1 and Y-1. Store X-1 in memory location LH. Store Y-1 in memory location LL.
   h. Enable interrupts and start timer 68

620. ISR
   a. If F is not set, then generate (X,Y) signal as follows:
      if TOUT = high, then
         MD0 ← LL
      otherwise
         MD0 ← LH
   b. Otherwise (F is set)
      i. if S = 0 then make a transition from (X,Y) signal to (X1,Y1) signal as follows:
         A. if TOUT = high, then
               MD0 ← LL
            otherwise
               MD0 ← LH1
         B. S ← 1
      ii. Otherwise (S=1) generate (X1,Y1) signal as follows:
         if TOUT = high, then
            MD0 ← LL1
         otherwise
            MD0 ← LH1

FIG. 8

530. a. Program microprocessor 1 to execute step 630 as the timer 68 ISR.
- b. Select desired clock as the input clock.
- c. Program timer 68 as an interval timer.
- d. Set the initial value of TOUT.
- e. Initialize TM0 and MD0.
- f. Set up microprocessor 1 to output a square wave on TOUT and to generate timer 68 interrupts.
- g. Determine numbers X-1 and Y-1.
  Store X-1 in memory location L.
  Store Y-1 in memory location L + 2.
  PX ← address of L.
- h. Enable interrupts and start timer 68

630. ISR
- a. if OUT = high, then
  - i. MD0 ← 2[PX]
- b. Otherwise (TOUT is low)
  - i. if F is set, then
    - A. PX ← address of L1
    - B. Reset F
  - ii. MD0 ← [PX]

FIG. 9

METHODS AND APPARATUS FOR PULSE-WIDTH MODULATION THAT USE A COUNTER AND A MODULUS DEVICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to generating electric signals, and more particularly to generating a square wave signal of any given period and duty cycle using an interval timer.

2. Description of Related Art

Interval timers are widely used in computer systems where some operations must be performed at precise intervals of time. Examples of such operations include updating a screen display or checking the state of a disk drive. The V25 ™ and V35 ™ type microprocessors are provided with timers that can be programmed as interval timers. The V25 microprocessor is described in $\mu$PD70320/322 (V25 ™) 16-*Bit, Single-Chip CMOS Microcomputers* (NEC Electronics, Inc. 1988; DOC. NO. UIC-UP50002A). The V35 microprocessor is described in $\mu$PD70330/322 (V35 ™) *Advanced 16-Bit, Single-Chip CMOS Microcomputers* (NEC Electronics, Inc. 1988; DOC. NO. JIC-UP50006). Both publications, as well as the microprocessors, are available from NEC Electronics Inc. in Mountain View, Calif.

Figure 1:
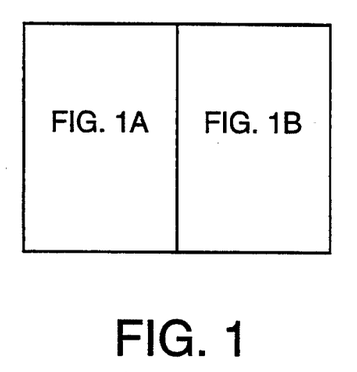
Figure 1A:
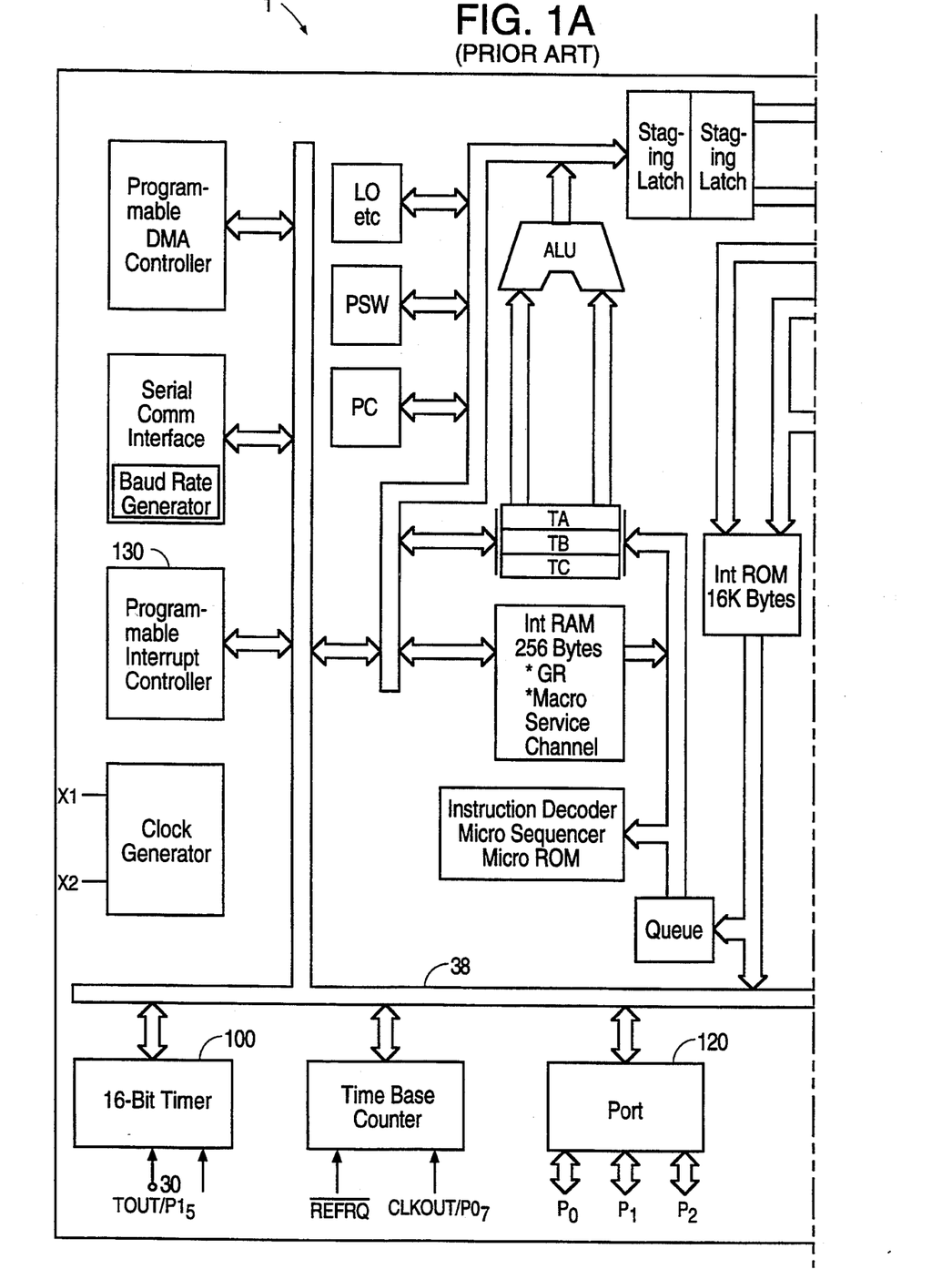
FIGS. 1A and 1B collectively form FIG. 1, which is a block-level schematic diagram of a V25 microprocessor.
Figure 1B:
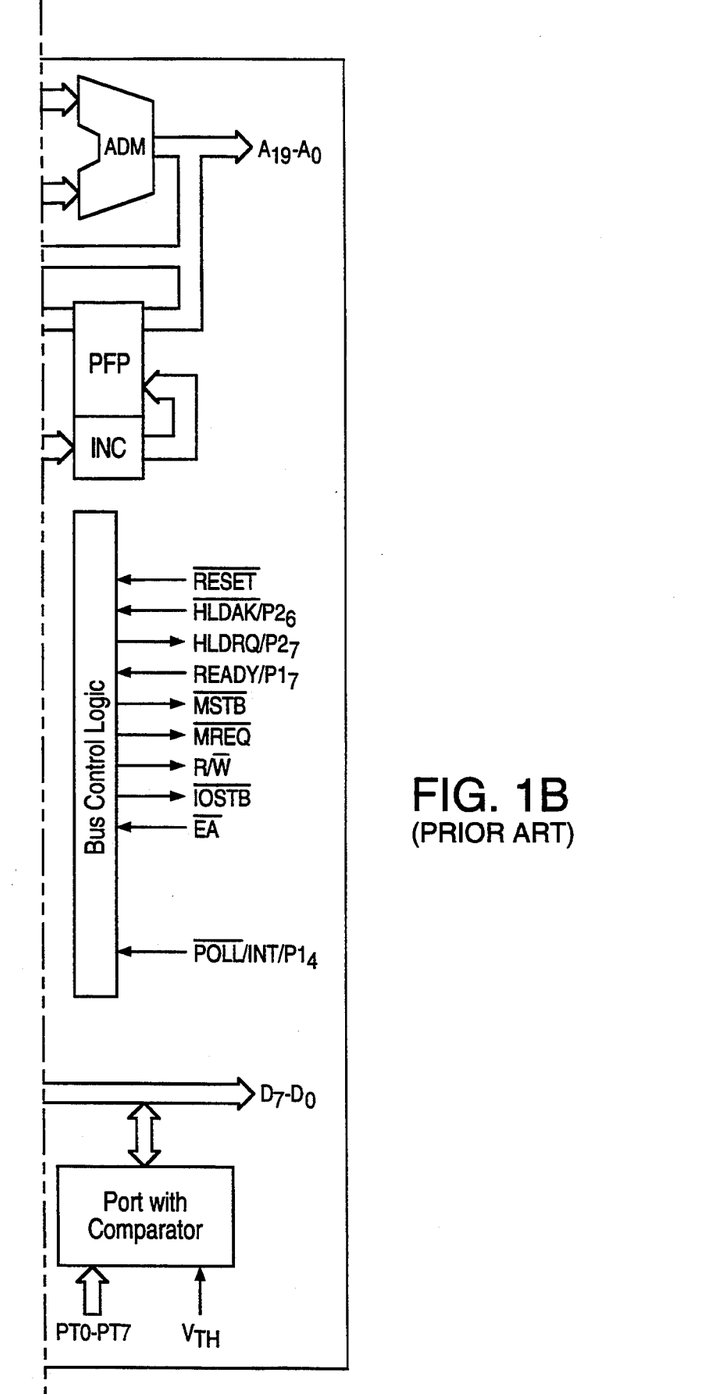

FIG. 1 shows a block diagram of the V25 microprocessor 1. Microprocessor 1 includes a 16-bit timer unit 100. Bus 38 connects timer unit 100 to other parts of microprocessor 1.

Figure 2:
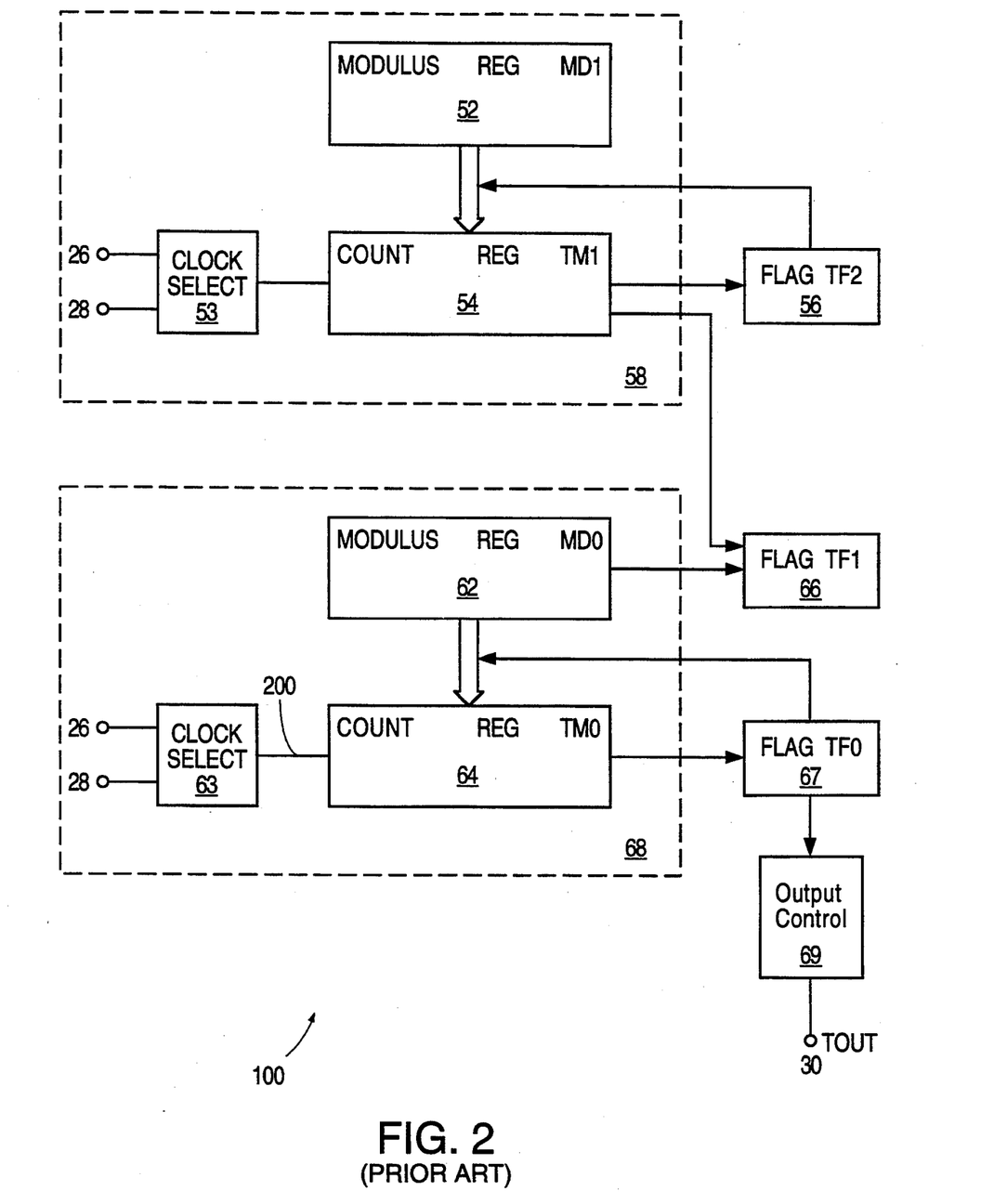
FIG. 2 is a block-level schematic diagram of a timer unit of a V25 microprocessor.

Timer unit 100 is shown in detail in FIG. 2. Timer unit 100 contains two timers—timer 58 and timer 68. Timer 68 contains a count register TM0 (reference numeral 64) and a modulus register MD0 (reference numeral 62). Timer 68 can be programmed in an interval timer mode. In this mode, TM0 register 64 and MD0 register 62 are initialized to certain values by microprocessor 1. TM0 register 64 is decremented by 1 on every cycle of an input clock. When TM0 register 64 counts down to 0, flag TF0 is set. This causes the value of MD0 register 62 to be loaded into TM0 register 64. Then TM0 register 64 resumes counting down. Thus TM0 register 64 counts from the value of MD0 register 62 down to 0 repeatedly until timer 68 is reprogrammed. TM0 register 64 reaches 0 at regular intervals of time.

Timer 68 is used to generate interrupts at regular intervals of time. Each time TM0 register 64 counts down to 0 and TF0 flag 67 gets set, an interrupt is requested.

Figure 3:
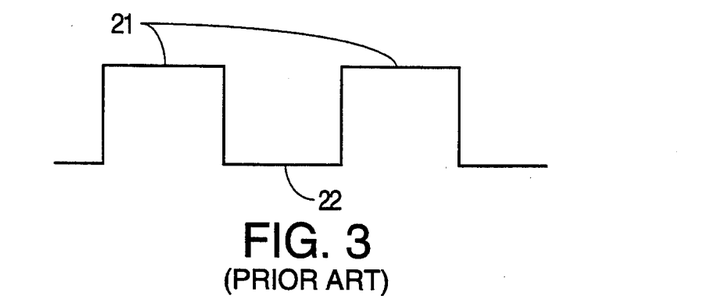
FIG. 3 is a graph showing a signal having a 50% duty cycle.

Timer 68 is used to generate square waves such as the square wave of FIG. 3. TF0 flag 67 is connected to an external output pin TOUT (reference numeral 30) of microprocessor 1 through output control 69. Microprocessor 1 generates a timer-out signal on TOUT pin 30. Each time TF0 flag 30 is set, the timer-out signal is toggled by output control 69. When timer 68 operates in the interval timer mode, the timer-out signal is a square wave with half-cycle equal to the time it takes TM0 register 64 to count from the value of MD0 register 62 to 0.

Timer unit 100 contains timer 58 which has a modulus register MD1 (reference numeral 52) and a count register TM1 (reference numeral 54). Timer 58 is also used to generate interrupts at regular intervals of time. Timer 58, however, is not connected to TOUT pin 30.

SUMMARY OF THE INVENTION

The present invention provides a simple and effective way to generate a square wave of an arbitrary period and duty cycle using an interval timer. The present invention also allows changing the square wave from one period and duty cycle to another at a rising or a falling edge of the signal as desired. The present invention allows changing the duty cycle of a signal without changing the period.

According to the present invention, a square wave signal in a system wherein a timer-out signal is toggled from one of first and second levels to the other when a counter of an interval timer counts to a preselected value is generated as follows. An interrupt is generated when the counter counts to the preselected value. Between two successive interrupts, a modulus register of the timer is loaded with a selected first value if the timer-out signal is of the second level, and with a selected second value different from the first value if the timer out signal if of the first level.

DETAILED DESCRIPTION

Figure 4:
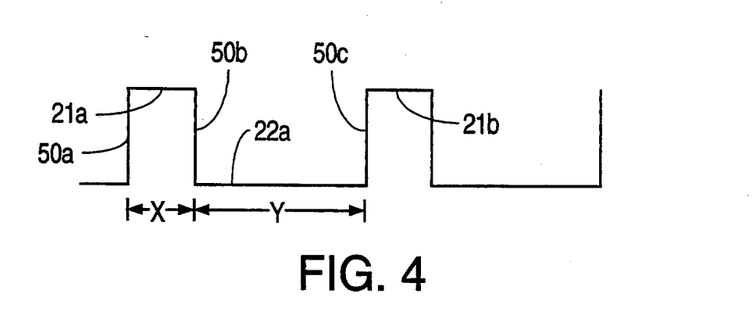
FIGS. 4–6 are graphs of signals generated in accordance with the present invention.

The duty cycle of a signal is computed according to the formula $$DT = X/(X+Y)$$

where dT is the duty cycle, X is the duration of the high portion of the signal in each period, and Y is the duration of the low portion. In the signal of FIG. 3, the duration X of each high portion 21 is the same as the duration Y of each low portion 22, X=Y, so DT=50%. FIG. 4 shows a diagram of a signal of non-50% duty cycle. The high portions 21a and 21b each last X cycles of the input clock, the low portions 22a and 22b each last Y cycles. X is not equal to Y so duty cycle DT is not 50%.

The signal of FIG. 4 is produced as follows. An input clock is selected to drive timer 58. Clock selecting circuit 63 selects input clock 26 or input clock 28. Clock 26 has frequency SCLK/6, where SCLK is a system clock of frequency $f_{OSC}/2$, and $f_{OSC}$ is an oscillator signal of a frequency from 10 to 25 MHz. Clock 28 has frequency SCLK/128. Clock selecting circuit 63 presents the signal from the selected clock on lead 200 to TM0 register 64.

Numbers X and Y are computed such that high portion 21a lasts X clock cycles and low portion 22a lasts Y clock cycles. For example, suppose it is desired to generate a square wave of period 4.8 ms and duty cycle 25%. High portion 21a lasts 1.2 ms (25% of 4.8 ms). and low portion 22a lasts 3.6 ms. If microprocessor 1 uses a 10 MHz oscillator, ($f_{OSC}$=10 MHz), then SCLK frequency is 5 MHz. Suppose clock 26 is selected. The frequency of clock 26 is 5/6 MHz, and its period is 6/5 $\mu$s, or 1.2 $\mu$s. High portion 21a lasts 1.2 ms, or 1000 cycles of clock 26. Thus X=1000. Low portion 22a lasts 3.6 ms, or 3000 cycles of clock 26. Thus Y =3000.

TM0 register 64 counts down by 1 on every cycle of the selected input clock. When TM0 register 64 reaches 0, it takes 1 clock cycle to load TM0 register 64 from MD0 register 62. Thus to generate the square wave of FIG. 4, TM0 register 64 is loaded with X−1 at point 50a, with Y−1 at point 50b, with X−1 at point 50c, and so on.

Timer 58 is programmed as an interval timer. At point 50a, TM0 register 64 reaches 0. MD0 register 62 contains X−1, which number is loaded from MD0 register 62 into TM0 register 64. TF0 flag 67 is set and an interrupt request is posted. While TM0 register 64 counts down from X−1 and the signal portion 21a is generated, microprocessor 1 processes the interrupt by executing an appropriate interrupt service routine ("ISR", a software program). The ISR loads MD0 register 62 with Y−1. At point 50b, Y−1 is loaded from MD0 register 62 into TM) register 64 and an interrupt request is posted. As TM0 register 64 counts down from Y−1 to 0 allowing portion 22a to be generated, the ISR loads MD0 register 62 with X−1. At points 50c, X−1 is loaded from MD0 register 62 into TF0 register 64, and portion 21b is generated. This continues until microprocessor 1 is reprogrammed.

Figure 7:
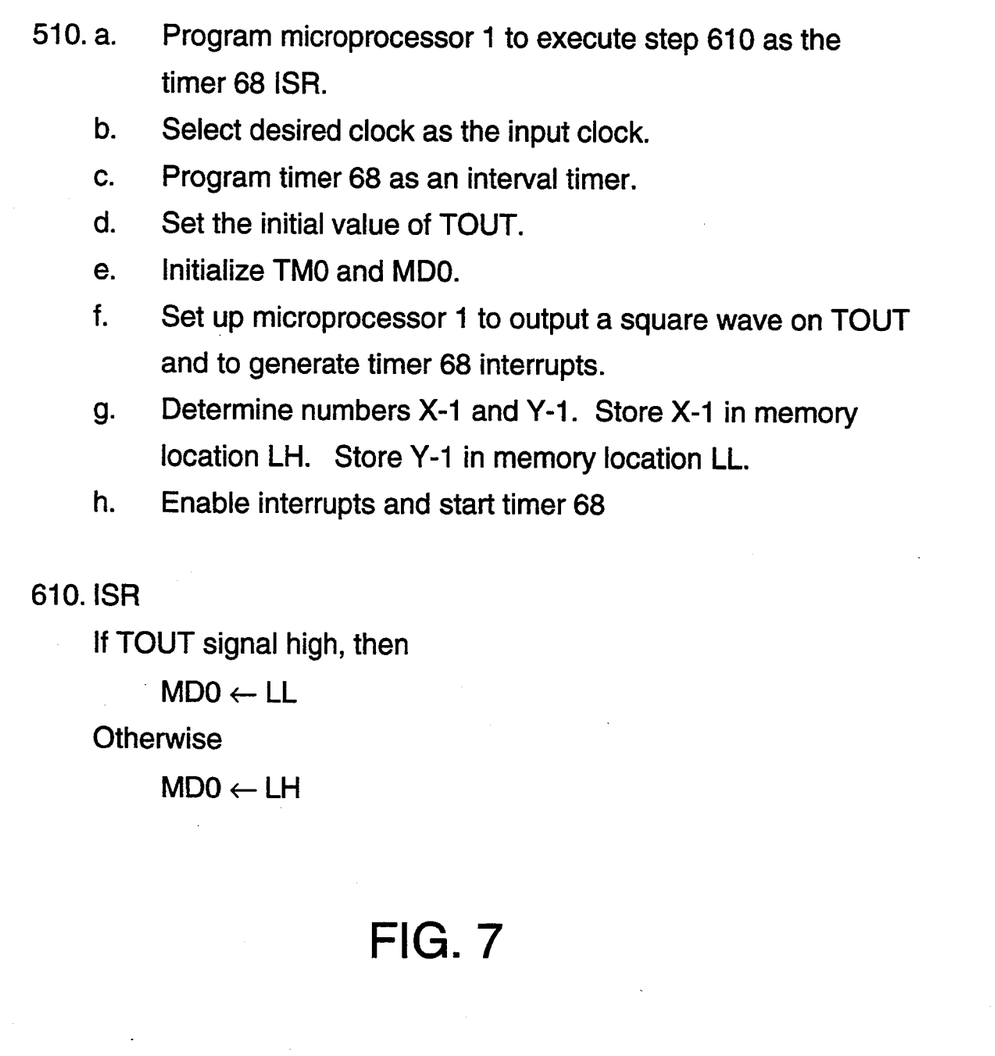
FIG. 7 is a pseudocode listing of a program for generating the signal of FIG. 4.

FIG. 7 shows the program executed by microprocessor 1 to generate the square wave of FIG. 4. The program is shown in pseudocode (pseudocode is a mixture of grammatically incomplete English and symbols). At step 510, initialization is performed. At step 510a, microprocessor 1 is programmed to execute step 610 as the ISR. At step 510b, clock 26 or clock 28 is selected as the input clock. At step 510c, timer 68 is programmed as an interval timer. At step 510d, the initial value of the TOUT signal is set. Steps 510b–510d are performed by writing an appropriate value into the timer control register TMC0. For example, to select clock 26 and to set the initial value of the TOUT signal to 0 (low), value 8 is written into TMC0. Register TMC0 is part of timer unit 100.

At step 510e, TM0 register 64 and MD0 register 62 are initialized. At step 510f, microprocessor 1 is set up to output a square wave on TOUT pin 30 and to generate interrupts when TM0 register 64 counts to 0. This is accomplished by writing number 20h (20 hexadecimal) to the Port Mode Control Register PMC1, number 0FFh to Port Mode Register PM1, and number 2 or 12h to Timer Interrupt Control Register TMIC0. Registers PM1 and PMC1 are part of port unit 120 (FIG. 1). Register TMIC0 is part of interrupt controller unit 130.

At step 510g, numbers X−1 and Y−1 are determined. X−1 is stored in a memory location LH. Y−1 is stored in a memory location LL. At step 510h, interrupts are enabled and timer 68 is started. Timer 68 is started by setting bit 7 of register TMC0.

At each timer 68 interrupt, ISR 610 is executed. ISR 610 checks whether the TOUT signal is high or low by reading port 1 of microprocessor 1 (not that the signal is toggled by the time ISR 610 starts to execute). If the TOUT signal is high, ISR 610 loads MD0 register 62 with the contents of memory location LL, that is with Y−1. If the signal is low, ISR 610 loads MD0 register 62 with the contents of location LH, that is with X−1. ISR 610 is executed with interrupts disabled.

Figure 5:
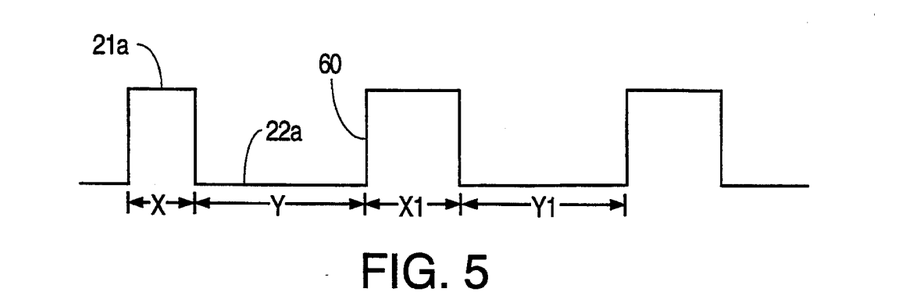

The square wave on TOUT pin 30 can be changed from one period and duty cycle to another at a rising edge of the signal, e.g. at point 60 (FIG. 5). For example, suppose it is desired to switch from the signal of a period and duty cycle corresponding to values X and Y (an (X,Y) signal) to the signal of a period and duty cycle corresponding to values X1 and Y1 (an (X1,Y1) signal). Then X1−1 must be loaded into MD0 register 62 at some point while the low portion 22a of the signal is being generated. And after point 60, the ISR must use X1 instead of X and Y1 instead of Y. This is done as follows. Once the ISR receives a request to change the signal from the (X,Y) signal to the (X1,Y1) signal, the ISR continues to generate the (X,Y) signal until the rising edge of the signal and switches to the (X12,Y1) signal at the rising edge.

Figure 8:
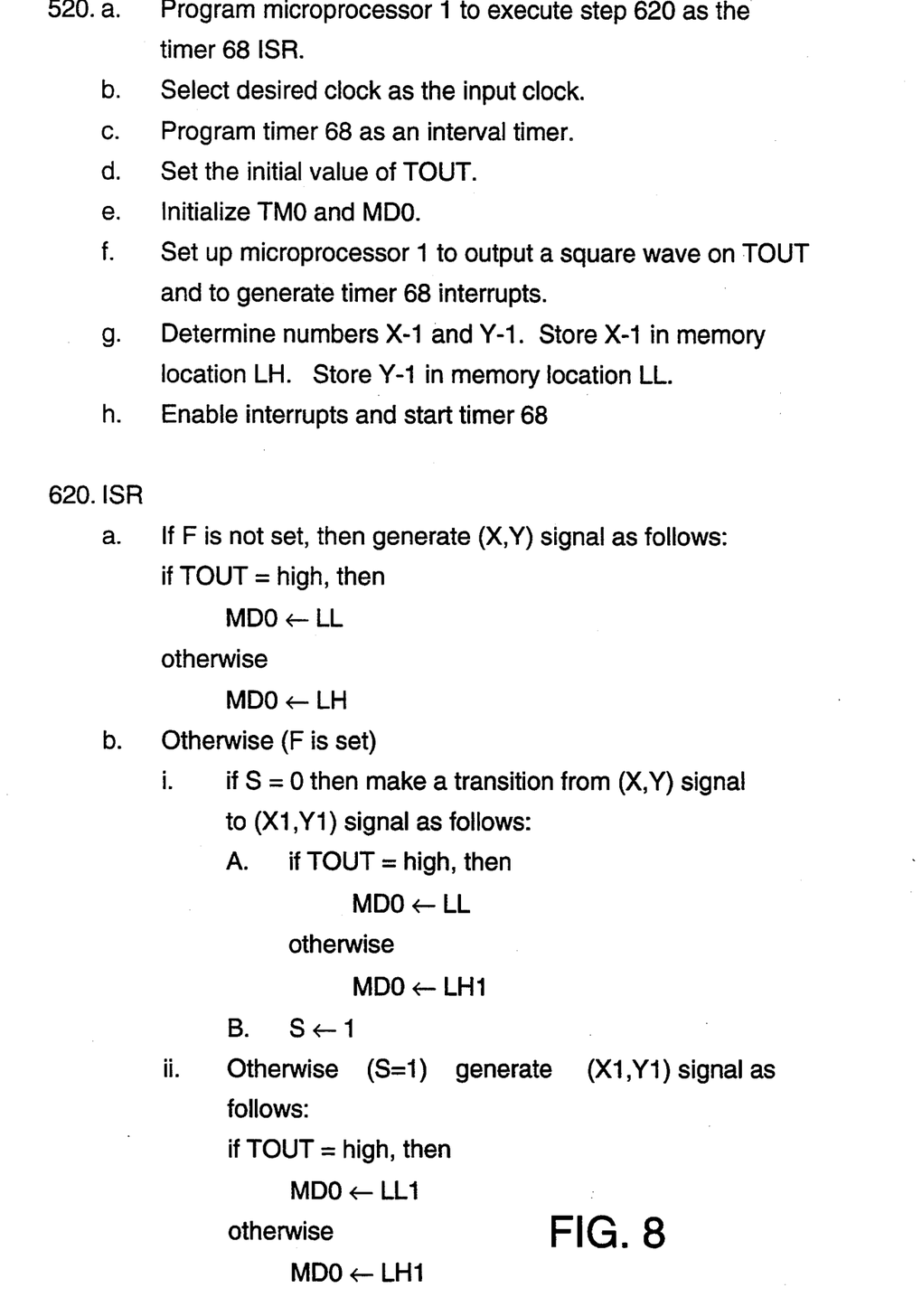
FIGS. 8 and 9 are pseudocode listings of programs for generating the signals of FIGS. 5 and 6.

FIG. 8 shows the program executed by microprocessor 1 to generate the square wave of FIG. 5. At step 520a, microprocessor 1 is programmed to execute step 620a as the timer 68 ISR. Steps 520b–520h are identical to steps 510b–510h of FIG. 7.

The program of FIG. 8 uses a software flag (variable) S to indicate whether the (X,Y) signal or the (X1,Y1) signal must be generated at the next interrupt; S=0 for (X,Y) signal and S=1 for the (X1,Y1) signal. A software flag F is set when a change from the (X,Y) signal to the (X1,Y1) signal is desired. The numbers X1−1 and Y1−1 are supplied before the signal change is desired to occur. X1−1 is supplied in a memory location LH1. Y1−1 is supplied in a memory location LL1. At first, F is not set, and ISR 620 executes step 620a thus generating the (X,Y) signal. When the (X1,Y1) signal is desired, F is set. The first time ISR 620 executes with F set (step 620b.i in FIG. 8), ISR 620 loads MD0 register 62 with the contents of location LL, that is with Y−1 if the TOUT signal is high, and with the contents of location LH1, that is with X1−1 if the signal is low. In the former case, a high portion of the (X,Y) signal is being generated and, when TM0 register 64 counts down to 0, a low portion of the (X,Y) signal must be generated, i.e. the signal must remain low for Y clock cycles. In either case ISR 620 sets S to 1 (step 620b.i.B) to indicate to itself that the (X1,Y1) signal must be generated starting with the next interrupt. Starting with the next interrupt, ISR 620 executes step 620b.ii. ISR 620 loads MD0 register 62 with the contents of location LL1, that is with Y1−1 is the signal is high and with the contents of location LH1, that is with X1−1 if the signal is low thus generating the (X1,Y1) signal.

In one embodiment, numbers X1−1 and Y1−1 are stored in the respective locations LH1 and LL1 only after flag F is set. Both numbers are stored before ISR 620 accesses the memory locations. While the numbers are stored, the interrupts are disabled to ensure that number storing will not be interrupted and delayed until after ISR 620 accesses the locations LH1 and LL1.

In the methods of FIG. 7 and 8, LL, LH, LL1 and LH1 may be V25 registers rather than memory locations.

Figure 9:
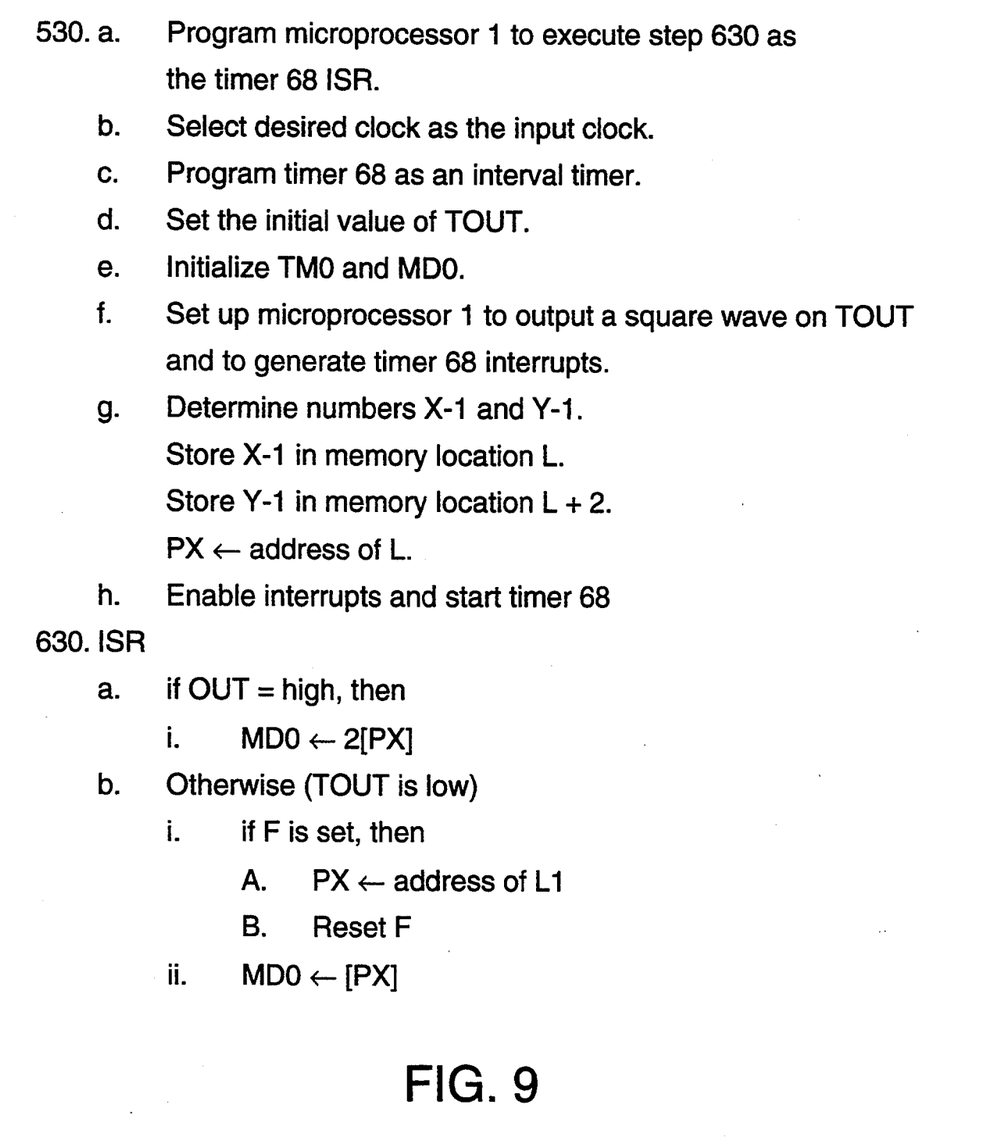

FIG. 9 illustrates another method of generating a signal of a variable duty cycle. At step 530a, microprocessor 1 is programmed to execute step 630 as the timer 68 ISR. Steps 530b-530f are identical to steps 510b-510f of FIG. 7. At step 530g, X−1 is stored in memory at an address L, and Y−1 is stored in memory at address L+2. The address value L is stored in a memory location PX. Step 530h is identical to step 510h.

At first, ISR 630 generates the (X,Y) signal. Flag F has not been set. If TOUT is high, ISR 630 executes step 630a.i. MD0 register 62 is loaded with 2[PX] which denotes the contents of memory at address stored in PX (that is, L) plus 2, i.e. at address L+2. At that address, number Y−1 is stored. So MD0 register 62 is loaded with Y−1. If TOUT is low, ISR 630 executes step 630b.ii. MD0 register 62 is loaded with [PX], that is with the contents of memory at address L. In other words, MD0 register 62 is loaded with X−1.

At some point, flag F is set to indicate that ISR 630 must switch to the (X1,Y1) signal. The numbers X1−1 and Y1−1 are supplied at some step before the signal change is desired to occur. X1−1 is supplied in memory at an address L1. Y1−1 is supplied in memory at an address L1+2. At the first interrupt after F has been set, if the TOUT signal is high, then step 630a.i is executed, that is MD0 register 62 is loaded with Y−1 so that the low portion of the (X,Y) signal will be generated after the next interrupt. The first time after flag F is set that the TOUT signal is low, step 630b.i is executed. Address L1 is stored in memory location PX. Flag F is reset. Then, at step 630b.ii, MD0 register 62 is loaded with [PX]. PX contains L1, so MD0 is loaded with the number at address L1, that is with X1−1.

Starting with the next interrupt, if TOUT is high, then MD0 register 62 is loaded with the number at address L1+2, i.e. with Y1−1 (step 630a.i); and if TOUT is low, then MD0 is loaded with the number at address L1, i.e. with X1−1 (step 630b.ii). Step 630b.i is not executed, because flag F was reset at step 630b.i.B.

A register can be chosen for PX rather than a memory location.

Figure 6:
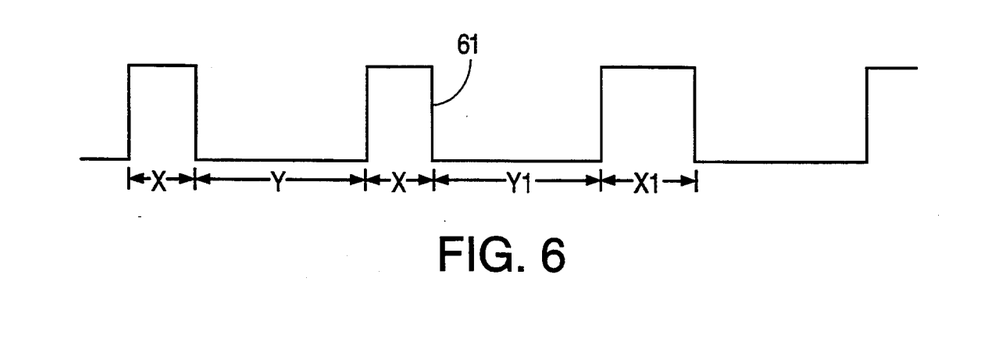

Similar techniques are used to change the TOUT signal from the (X,Y) signal to the (X1,Y1) signal at a falling edge of the signal, FIG. 6 shows a graph of the resulting signal. The period and duty cycle are changed at the falling edge at point 61.

Similar methods are used to vary the period and duty cycle of the TOUT signal among many values. In one embodiment, a program similar to the program of FIG. 9 is used. When it is desired to change the period and the duty cycle, flag F is set and memory location PX is provided with an address from which the ISR determines numbers X and Y corresponding to the new period and duty cycle.

Digital signals of a variable duty cycle are used in a Manchester type synchronous serial date communication channel. A "1" in the serial data stream is represented by a 75% duty cycle. A "0" is represented by a 25% duty cycle. The frequency, and hence the period, of the signal remains constant. The duty cycle is changed on the rising edge of the signal. The programs similar to programs of FIGS. 8 and 9 are used to produce the serial data stream. Flag F is set if the next digit (0 or 1) to be transmitted is different from the digit being transmitted. Flag F is reset if the two digits are the same.

Digital signals of a variable duty cycle are used to control electrical motors and other devices. The signals are input to a filter whose output voltage is proportional to the duty cycle of the digital signals. The programs similar to programs of FIGS. 8 and 9 are used.

Microprocessor 1 can be programmed in respective steps 510f, 520f and 530f of FIGS. 7, 8 and 9 to process timer 68 interrupts in any of its interrupt processing modes, including vectored interrupt mode and bank switching mode. Bank switching mode is faster yet more complex.

In vectored interrupt mode, the address of the ISR is stored at memory address 70H in steps 510a, 520a, 530a. When microprocessor 1 accepts the interrupt, it executes the ISR whose address is stored at address 70H.

In bank switching mode, the address of the ISR and the values to be loaded into certain registers of microprocessor 1 (the ISR register bank) are stored in a predetermined memory area at steps 510a, 520a, 530a. When microprocessor 1 accepts the interrupt, it saves the current values of those registers (the interrupted program register bank) in another area of memory and then reloads those registers with values from the ISR register bank. After finishing the ISR execution, microprocessor 1 reloads those registers with the values of the interrupted program register bank.

Appendix I provides an assembly listing of a program generating the signal of FIG. 5. Appendix II provides an assembly listing of another such program. The program of Appendix I uses register bank switching mode. The program of Appendix II uses vectored interrupt mode.

While the invention has been described with respect to the embodiments set forth above, other embodiments and variations not described herein are within the scope of my invention. For example, the programs of FIGS. 7-9 may be modified to generate the square wave without using interrupts as long as respective steps 610-630 are performed between each two successive moments in which TM0 register 64 counts down to 0.

Furthermore, the method of this invention can be used with any circuit comprising an interval timer which includes a counter for counting to a final value and a modulus device for performing the function of MD0 register 62, i.e., for storing a value to be loaded into the counter when the counter reaches the final value, wherein the circuit allows a value to be loaded into the modulus device between each two successive moments in which the counter reaches the final value and wherein the circuit generates a 2-level signal which is toggled whenever the counter reaches the final value. For example, the circuit could generate an end-count signal (a counterpart of an interrupt in the V25 and V35 microprocessors) each time the counter reaches the final value, and, at this end-count signal, to load the modulus device with an appropriate value.

Other embodiments and variations not described herein are to be considered within the scope of the invention, as defined by the following claims.

What is claimed is:

1. A method of generating a square wave signal in a system wherein a timer-out signal is toggled from one of first and second levels to another when a counter of an interval timer counts to a preselected value, comprising the electrical-circuitry-implemented steps of:

generating an interrupt in response to said counter counting to said preselected value;

on each of a plurality of successive interrupts generated by said generating step, performing the steps of:

loading said counter from a modulus register;
determining whether said timer-out signal is of said first level or said second level; and
after loading said counter from said modulus register, loading said modulus register with a next value to be loaded into said counter when said counter counts to said preselected value, wherein the next value is:
a selected first value determining a duration of a first-level portion of said timer-out signal, if said timer-out signal is of said second level; and
a selected second value determining a duration of a second-level portion of said timer-out signal and different from said first value, if said timer-out signal is of said first level; and
during said modulus register loading step, counting by said counter towards said preselected value; and
after the last interrupt of said plurality of interrupts, changing said square wave signal period and duty cycle at a point of time when said timer-out signal toggles from said second level to said first level, said step of changing comprising the steps of:
at the first interrupt after said plurality of said interrupts, loading said modulus register with:
a selected third value if said timer-out signal is of said second level; and
said second value if said timer-out signal is of said first level;
at each interrupt following said first interrupt, loading said modulus register with:
said third value if said timer-out signal is of said second level;
a selected fourth value if said timer-out signal is of said first level;
wherein
$(v1-v2)^2+(v3-v4)^2$ is not equal to 0, wherein
v1 is said first value;
v2 is said second value;
v3 is said third value;
v4 is said fourth value;
during said modulus register loading steps, counting by said counter towards said preselected value.

2. A method of generating a first 2-level square wave signal of a predetermined period and a predetermined non-50% duty cycle on an output lead of a circuit, comprising the electrical-circuitry-implemented steps of:
determining a first value and a second value different from said first value from said predetermined period and said duty cycle;
generating an end-count signal when a counter counts to a selected final value;
following said steps of determining and generating,
if a signal on said output lead is of a first level, then changing it to a second level different from said first level; and if it is of said second level, then changing it to said first level; and
loading a value from a modulus device into said counter;
following the above steps, counting by said counter to said final value;
after said level changing step but before said counter counts to said final value, and while said counter counts to said final value, loading said modulus device with:
said first value if said signal is of said second level; and
said second value if said signal is not of said second level;
determining a third value and a fourth value from a period and a duty cycle of a second square wave signal;
after said step of loading said modulus device, performing a wave changing step of:
repeating said generating step through said counting step;
before said counter counts to sad final value, and while said counter counts to said final value, loading said modulus device with:
said third value if said signal is of said second level; and
said second value if said signal is of said first level; and
if said signal is then of said second level, repeating said wave changing step.

3. A method of generating a first 2-level square wave signal of a predetermined period and a predetermined non-50% duty cycle on an output lead of a circuit, comprising the electrical-circuitry-implemented steps of:
determining a first value and a second value different from said first value from said predetermined period and said duty cycle;
generating an end-count signal when a counter counts to a selected final value;
following said steps of determining and generating,
if a signal on said output lead is of a first level, then changing it to a second level different from said first level; and if it is of said second level, then changing it to said first level; and
loading a value from a modulus device into said counter;
following the above steps, counting by said counter to said final value;
after said level changing step duty before said counter counts to said final value, and while said counter counts to said final value, loading said modulus device with:
said first value if said signal is of said second level; and
said second value if said signal is not of said second level;
wherein:
said counter is register TM0 of a chip of NEC V25/35 family;
said modulus device is register MD0 of said chip;
said output lead is pin TOUT of said chip;
said end-count signal is an interrupt signal of said chip; and
said steps of loading said modulus device are performed by an interrupt service routine processing said interrupt signals.

4. A device for generating a first 2-level square wave signal of a predetermined period and a predetermined non-50% duty cycle, comprising:
an output lead on which said signal is generated;
a counter;
a modulus device;
means for determining a first value and a second value different from said first value from said period and said duty cycle;
means for generating an end-count signal when said counter counts to a selected final value;

means responsive to said generating means, for changing a signal on said output lead to a second level if said signal is of a first level, and to said first level if said signal is of said second level;

means responsive to said generating means, for loading a value from said modulus device into said counter;

means responsive to said changing means and said loading means, for counting by said counter to said final value; and means responsive to said changing means and said loading means, for loading said modulus device, before said counter counts to said final value and while said counter counts towards said final value, with:

said first value if said signal is of said second level; and said second value if said signal is of said first level;

wherein:
said counter is register TM0 of a chip of NEC V25/35 family;
said modulus device is register MD0 of said chip;
said output lead is pin TOUT of said chip;
said end-count signal is an interrupt signal of said chip;
said modulus device loading means is an interrupt service routine processing said interrupts.

* * * * *